(12) United States Patent
Regg et al.

(10) Patent No.: US 9,588,489 B2
(45) Date of Patent: Mar. 7, 2017

(54) COMPUTATIONAL HIGHLIGHT HOLOGRAPHY

(75) Inventors: Christian Regg, Emmenbrücke (CH); Szymon Marek Rusinkiewicz, Princeton, NJ (US); Wojciech Matusik, Lexington, MA (US); Markus Gross, Uster (CH)

(73) Assignees: Disney Enterprises, Inc., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 971 days.

(21) Appl. No.: 13/167,601

(22) Filed: Jun. 23, 2011

(65) Prior Publication Data

US 2012/0019882 A1     Jan. 26, 2012

Related U.S. Application Data

(60) Provisional application No. 61/358,366, filed on Jun. 24, 2010.

(51) Int. Cl.
*G03H 1/08* (2006.01)

(52) U.S. Cl.
CPC ..... *G03H 1/0808* (2013.01); *G03H 2210/441* (2013.01); *G03H 2210/452* (2013.01)

(58) Field of Classification Search
CPC .. G03H 2210/36; G03H 1/02; G03H 2225/61; G03H 2210/20; G03H 2001/0038; G03H 2001/0055; G03H 2001/0088; G03H 2001/0426; G03H 2001/303; G03H 2001/306; G03H 2210/32; G03H 2210/44; G03H 2210/441; G03H 1/0443; G03H 1/22; G03H 1/2249; G03H 2001/0825; G03H 2001/2263; G03H 2210/40; G03H 1/0866; G03H 1/0891; G03H 1/26; G03H 1/30; G03H 2001/0421; G03H 2001/0428; G03H 2001/0816; G03H 2001/0883; G03H 2001/2255; G03H 2001/2265;
(Continued)

(56) References Cited

U.S. PATENT DOCUMENTS 4,969,700 A * 11/1990 Haines ............................. 359/9
6,047,088 A *  4/2000 van Beek et al. ............ 382/243
(Continued)

OTHER PUBLICATIONS

Pauly et al, Spectral Processing of Point-Sampled Geometry, ACM SIGGRAPH, Aug. 12-17, 2001, pp. 379-386.*
(Continued)

*Primary Examiner* — Stephone B Allen
*Assistant Examiner* — Jyotsna Dabbi
(74) *Attorney, Agent, or Firm* — Patterson + Sheridan, LLP

(57) ABSTRACT

A technique for fabricating a highlight hologram based on a digital object performs point sampling on the object and represents each sampled point as a geometric patch. A set of geometric patches corresponding to sampled points from the object are fabricated into a substrate. A paraboloid patch may be used for reflective substrates while a hyperboloid may be used for transmissive substrates. To avoid specifying overlapping patches, which are impractical to fabricate, certain of the sample points may be merged. An output set of grooves is saved and may be used to specify fabrication of a highlight hologram on the physical substrate.

12 Claims, 14 Drawing Sheets

(58) Field of Classification Search
CPC ... G03H 2001/2268; G03H 2001/2273; G03H 2001/2605; G03H 2001/2685
See application file for complete search history.

(56) References Cited

U.S. PATENT DOCUMENTS

2003/0091226 A1* 5/2003 Cahill et al. .................. 382/154
2010/0149312 A1* 6/2010 Schwerdtner .................. 348/40

OTHER PUBLICATIONS

Richard Pito, "Mesh Integration based on Co-Measurements" IEEE, 1996, 0-7803-3258-X/96, pp. 397-400.*
Beaty (Drawing Holograms by Hand, Proc. SPIE-IS & T Electronic Imaging, vol. 5005 (2003), pp. 156-167).*

* cited by examiner

COMPUTATIONAL HIGHLIGHT HOLOGRAPHY

CROSS-REFERENCE TO RELATED APPLICATIONS

This application claims benefit of U.S. provisional patent application Ser. No. 61/358,366, filed on Jun. 24, 2010. This related application is hereby incorporated herein by reference.

BACKGROUND

Field of the Invention

The present invention relates to the field of computer graphics and, in particular, to a system and method for computational highlight holography.

Description of the Related Art

A hologram creates a representation of a three-dimensional object viewable from the surface of a holographic substrate. A hologram should represent both binocular parallax and motion parallax. Binocular parallax gives rise to stereopsis, a perceived fusion of two slightly different images of a scene that are observed by a person's two eyes. Binocular parallax normally gives rise to a strong sensation of depth. Motion parallax refers to a different relative motion of objects at different depths in a scene perceived as a viewer moves with respect to the objects. Motion parallax also gives rise to a strong sensation of depth.

Traditional holography comprises an analog recording process whereby coherent light reflecting from a scene undergoes interference with a reference beam, and the resulting fringes are recorded on a photographic plate. In a reproduction step, for viewing the resulting hologram, light from the reference beam is diffracted by the fringes, recreating the original light field wavefront. The wavefront reproduces different views from which a viewer's eyes can observe the scene, thereby producing parallax effects that give rise to a sensation of depth. Traditional holograms are difficult to record, requiring sub-wavelength vibration control, and they can only be viewed using coherent light. Practical holography was enabled by white light transmission and reflection rainbow holograms. These holograms can include color and can be viewed using natural light. These properties are obtained by sacrificing parallax in the vertical direction. Rainbow holograms can be mass-produced using special embossing of micro-surface reliefs in plastic films. However, designing and recording white light holograms is still extremely expensive and not practical for producing large holograms.

A mechanical, or "scratch," hologram is produced with a set of semicircular arcs scratched into a plastic or metal substrate. The arcs are conventionally scratched by hand in a manual process. Each arc corresponds to a point on an object being represented. Relative positions of the scratches correspond to relative positions of points on the object. A bright light is required to view a scratch hologram, which produces a set of highlight points corresponding to the points on the object. As the hologram substrate is moved with respect to a viewer, the highlight points move along their respective arc, approximating parallax and giving the user a sense of depth. Mechanical holograms typically offer little control over consistency, resolution or what is actually recorded and are labor intensive to produce.

As the foregoing illustrates what is needed in the art is an improved technique for fabricating a hologram.

SUMMARY

One embodiment of the present invention sets forth a computer-implemented method for generating a highlight hologram based on one or more patches. The method includes sampling a plurality of points from a graphics object, that defines one or more representative geometric features of the graphics object, computing one or more patches associated with the plurality of sampled points, where each of the one or more patches is configured to focus light from a source through a virtual point corresponding to a different one of the sampled points, and storing the one or more patches in memory.

One advantage of the disclosed technique is that it enables a highlight hologram to be generated in automated fashion via a fabrication machine, such as a numerically controlled engraver or milling machine. Further, because, in the disclosed technique, each surface feature for each virtual point included in the highlight hologram is computed independently, the technique may be applied to non-planar substrates.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention relate to computational highlight holography, a technique that converts three-dimensional (3D) computer models into mechanical "holograms" fabricated on a substrate of reflective or refractive materials. One surface of the substrate includes a plurality of small grooves with patches of paraboloids or hyperboloids, each of which produces a highlight when illuminated by a directional light. Each highlight appears in different places for different viewing directions, with correct binocular and motion parallax corresponding to a virtual 3D point position. Embodiments of the invention include a computational pipeline that begins with a 3D model and desired view position. The computational pipeline samples the model to generate points that depict model features accurately, and computes a maximal set of non-overlapping patches to be embedded in the surface. In one embodiment, the computational pipeline is implemented as a software package configured to execute on a computer system. Embodiments provide a preview of the hologram for the user prior to fabricating the surface using a computer-controlled engraving machine. Embodiments provide a variety of different fabricated holograms including, without limitation, reflective, transmissive, colored and shaded. Embodiments also provide stationary and animated 2D stippled images.

System Overview

Figure 1:
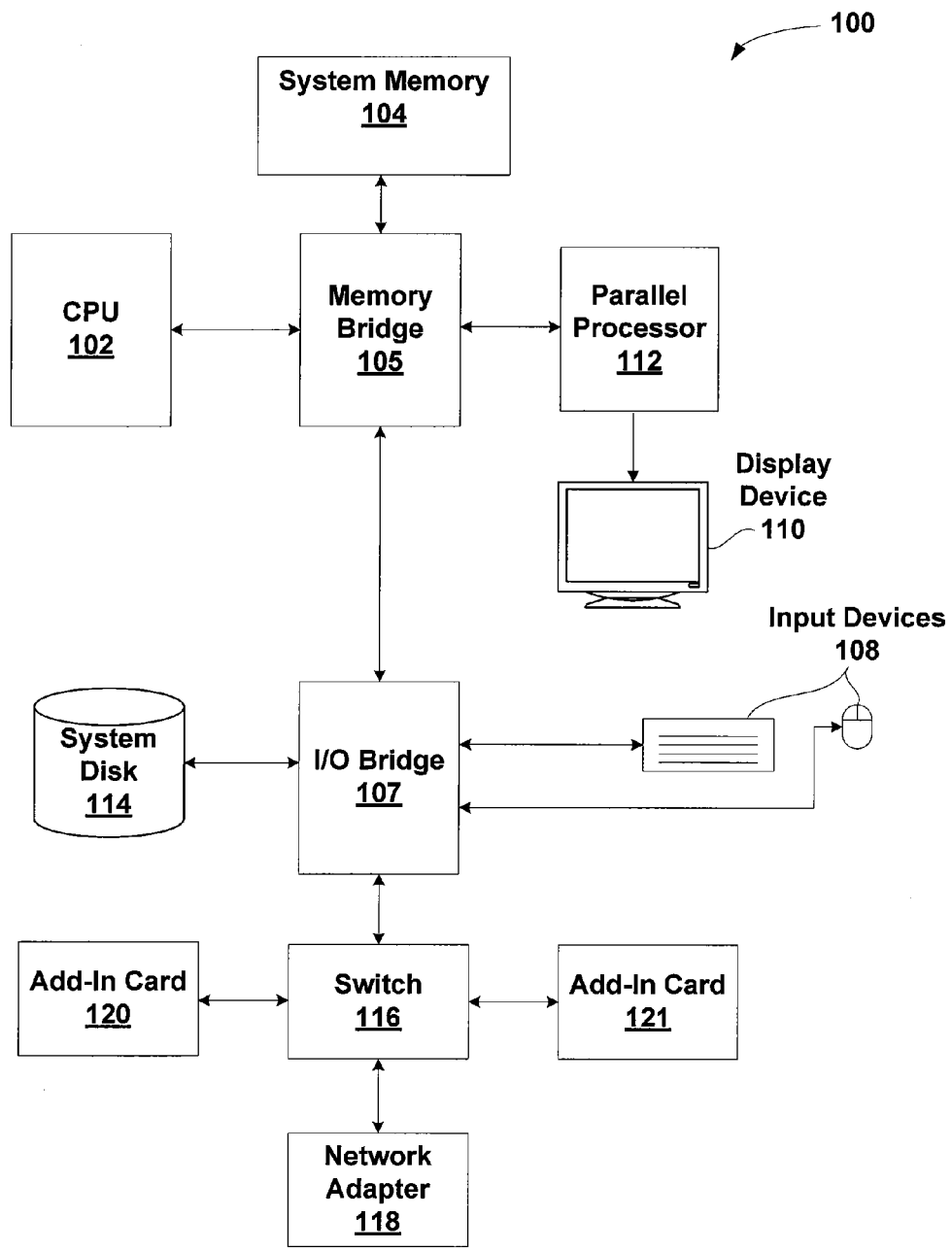
FIG. 1 depicts one architecture of a system within which embodiments of the present invention may be implemented.

FIG. 1 depicts one architecture of a system 100 within which embodiments of the present invention may be implemented. This figure in no way limits or is intended to limit the scope of the present invention. System 100 may be a personal computer, video game console, personal digital assistant, rendering engine, mobile phone, slab computer, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, a render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Computational Highlight Holography

Embodiments of the present invention provide techniques for generating computational highlight holographs from digital models, such as 3D models, stipple models, and animation frames. The digital model is transformed into a set of physical features, such as grooves with patches of paraboloids or hyperboloids, which define a set of reflective or refractive features to be fabricated into a substrate. The physical features may be fabricated onto the substrate via a numerically controlled engraver.

A mathematical derivation for a surface feature that produces a virtual image of a 3D point is described for reflective and refractive cases. Next a technique for picking points that adequately describe a 3D model is described. Then a technique for filling the hologram with surface features is described.

Figure 2:
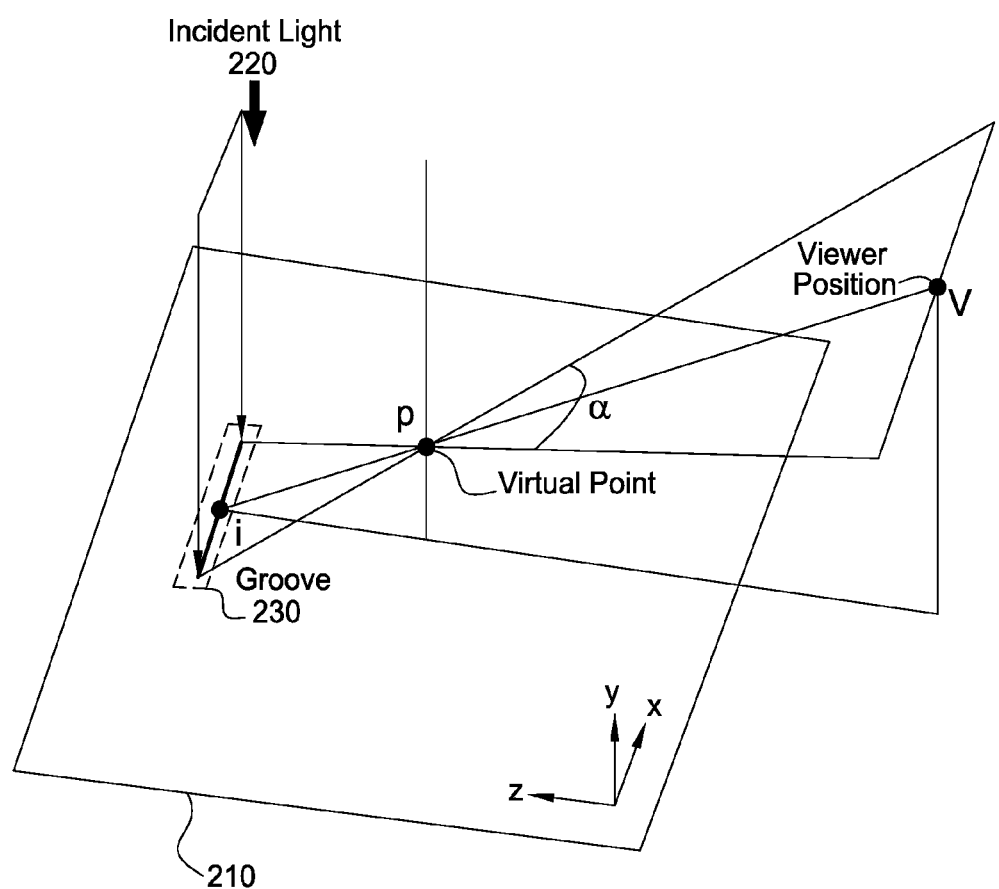
FIG. 2 illustrates derivation of a reflective patch comprising a rectangular groove that corresponds to a virtual point (P), according to one embodiment of the present invention

FIG. 2 illustrates derivation of a reflective patch comprising a rectangular groove 230 that corresponds to a virtual point (P), according to one embodiment of the present invention. As shown, an incident light 220 with direction l=(0, −1,0)$^T$ illuminates the rectangular groove 230. The rectangular groove 230 comprises a surface feature configured to focus the incident light 220 to produce an image at virtual point (P). A viewer position (v) may range along a ±x direction, with viewing angle α denoting a total horizontal field of view. A particular ray of incident light 220 striking a point along the center (i) of the rectangular groove 230 is focused through the virtual point (P) to a specific viewer position (v). When the view position (v) varies, the virtual point (P) appears to be located in a fixed position in 3D space. In one embodiment, the surface feature defining the groove 230 comprises a patch (section) of a paraboloid fabricated into substrate 210.

Figure 3:
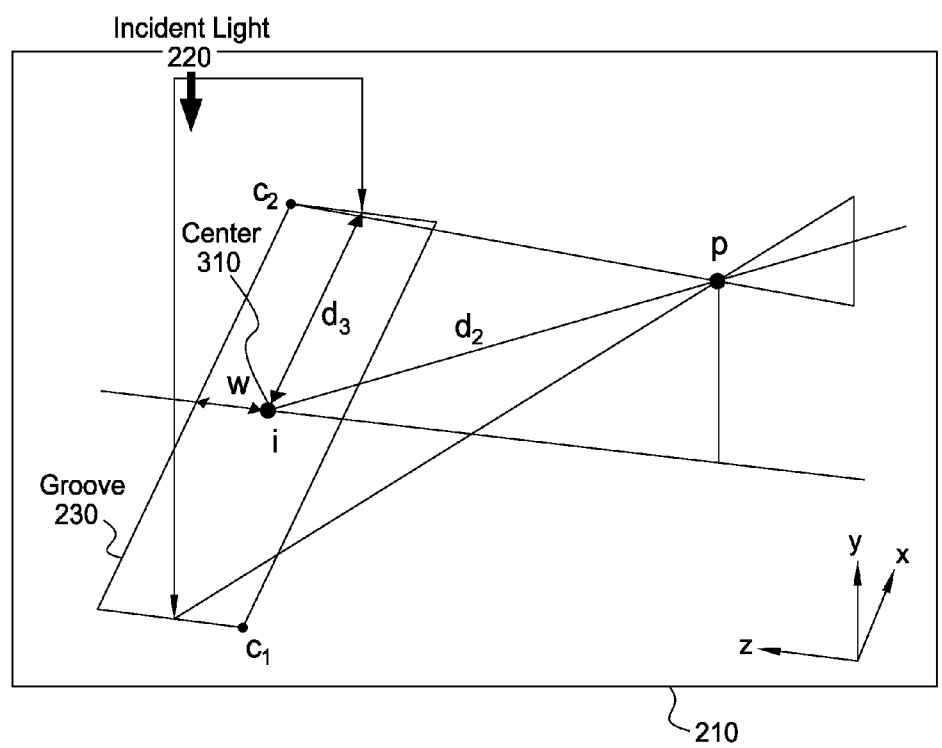
FIG. 3 is a detailed view of a rectangular groove for the virtual point, according to one embodiment of the present invention.

FIG. 3 is a detailed view of a rectangular groove 230 for the virtual point (P), according to one embodiment of the present invention. As shown, the extent of the rectangular groove 230 essentially comprises a line segment of width 2w in a plane. The line is defined by projected lines passing through virtual point (P) and the viewer position (v). The planar rectangular groove 230 is a departure from prior art techniques for fabricating mechanical holograms which conventionally fabricated grooves defined by circular arc sections. A center 310 for the rectangular groove 230, given by vector i, is determined by casting a ray from the center of view position (v) through virtual point (P), and intersecting the hologram plane, as given below in Equation 1.

$$i = v - \left(\frac{v_y}{p_y - v_y}\right)(p - v) \quad \text{(Equation 1)}$$

The rectangular groove 230 has a length 2·$d_3$ defined by a specified field of view (FOV). Half of the extent of the rectangular groove in the x dimension (along the main axis of the rectangular groove) is represented by $d_3$ and given by Equation 2. In this equation, $d_2$ defines a distance d2=∥p−i∥ from the virtual point (P) to the center of the rectangular groove 230.

$$d_3 = d_2 \tan\left(\frac{\alpha}{2}\right) \quad \text{(Equation 2)}$$

Occlusion of the virtual point (P) refers to a disappearance of the virtual point (P) from certain viewing directions. To simulate occlusion, the FOV is modified and may include a different FOV for each side of the rectangular groove 230.

In one embodiment, the extent of the rectangular groove 230 is defined by Equations 3, below. Persons skilled in the art will recognize that Equations 3 represent the extent of rectangular groove 230 for a symmetric extent with respect the center of the rectangular groove 230, however other extents, such as extents intended to model occlusion, may be implemented without departing the scope and spirit of the present invention.

$$c_1 = \begin{pmatrix} i_x - d_3 \\ 0 \\ i_z - \frac{w}{2} \end{pmatrix} \text{ and, } c_2 = \begin{pmatrix} i_x + d_3 \\ 0 \\ i_z + \frac{w}{2} \end{pmatrix} \quad \text{(Equation 3)}$$

Figure 4:
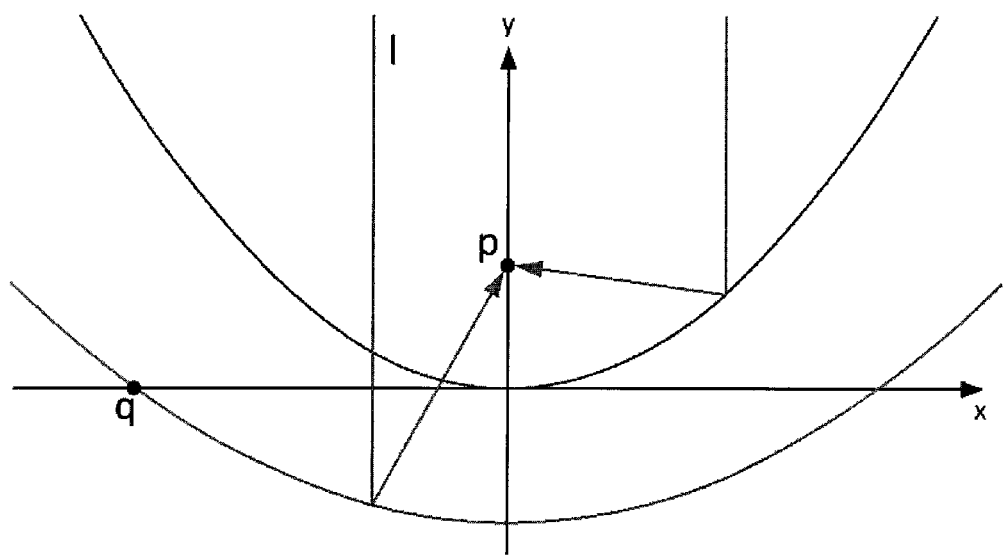
FIG. 4 depicts a cross-section of two paraboloids having the virtual point as foci, according to one embodiment of the present invention.

FIG. 4 depicts a cross-section of two paraboloids having the virtual point (P) as foci, according to one embodiment of the present invention. In a reflective hologram, the rectangular groove 230 of FIG. 2 may implement one or more parabolic sections for a surface feature corresponding to the virtual point (P). A paraboloid reflects a bundle of parallel rays to cause the rays to pass through a point, such as the virtual point (P). Deriving the necessary parabolic shape follows the observation that surface $S: \mathbb{R}^2 \to \mathbb{R}$ is defined below by Equation 4.

$$y = S(x, z) = \frac{1}{4p_y}((x - p_x)^2 + (z - p_z)^2) \qquad \text{(Equation 4)}$$

Ideally, this surface reflects incident light from $l=(0, -1,0)^T$ to the virtual point (P). Equation 4 has the form of a paraboloid of revolution and is concave as seen from above the surface if the sign of $p_y$ is positive. Similarly, the paraboloid of revolution is convex, as seen from above the surface, if the sign of $p_y$ is negative.

Each surface in a family of paraboloids of the form expressed in Equation 5 has the characteristic of focusing parallel rays of light through the virtual point (P), where $sgn(d)=sgn(p_y)$.

$$S_d(x, z) = \frac{1}{4d}((x - p_x)^2 + (z - p_z)^2) + (p_y - d) \qquad \text{(Equation 5)}$$

A paraboloid may be selected that passes through an additional point (q), as shown in FIG. 4. For the paraboloid to pass through the additional point (q), the condition expressed below in Equation 6 must hold:

$$q_y = \frac{1}{4d}((q_x - p_x)^2 + (q_z - p_z)^2) + (p_y - d) \qquad \text{(Equation 6)}$$

This condition yields a quadratic equation with respect to d. The resulting discriminant is always positive and d is given below in Equation 7.

$$d = \frac{1}{2}((p_y - q_y) + \text{sgn}(p_y)\|p - q\|) \qquad \text{(Equation 7)}$$

Figure 5:
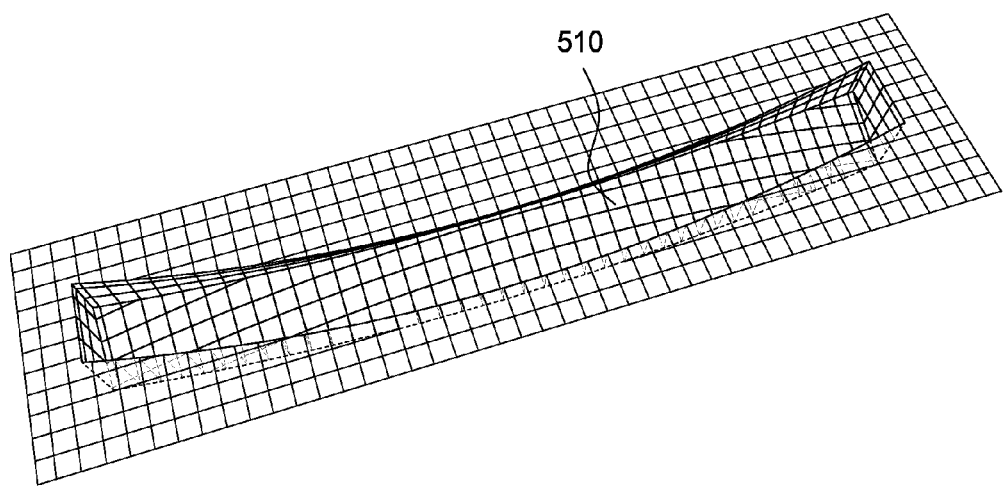
FIG. 5 illustrates a surface patch comprising a paraboloid surface feature embedded below a substrate surface, according to one embodiment of the present invention.

FIG. 5 illustrates a surface patch 510 comprising a parabolic surface feature embedded below a substrate surface, according to one embodiment of the present invention. As shown, the parabolic surface feature may be formed as a rectangular groove, such as rectangular groove 230 of FIG. 2. Furthermore, as described previously, there are many possible paraboloids having a focus corresponding to the virtual point (P), allowing a free selection of an optimal paraboloid definition for generating the rectangular groove. To select a paraboloid definition suitable for fabrication, two conditions are imposed: first, because the parabolic surface feature may be fabricated using subtractive (engraving) technology, the paraboloid must be disposed entirely below or at the substrate surface within the bounding region of the rectangular groove; second, to minimize material removal, at least one point on the paraboloid must be at the substrate surface. Satisfying these conditions requires a different procedure depending on whether the paraboloid is concave or convex, which is dependent on whether the virtual point (P) is above or below the surface.

In a concave scenario, the highest point on the paraboloid will be one of the four corners of the rectangular region bounding the paraboloid. In one embodiment, each of the four corners is assigning as the additional point (q) when evaluating the paraboloid. If the paraboloid is evaluated as being entirely below the substrate surface, then the corer may be selected as the additional point (q) for evaluation purposes.

In a convex scenario, a unique paraboloid is determined that is tangent to the xz plane. Persons skilled in the art will recognize that the point of tangency is $(p_x, 0, p_z)^T$. If this point of tangency lies within the rectangular region, then the point of tangency may be used as the additional point (q) for evaluating the paraboloid. Otherwise, the point closest to the boundary of the rectangle may be used as the additional point (q).

In both concave and convex scenarios, the additional point (q) and the virtual point (P) collectively define the shape of the paraboloid within patch 510.

Figure 6:
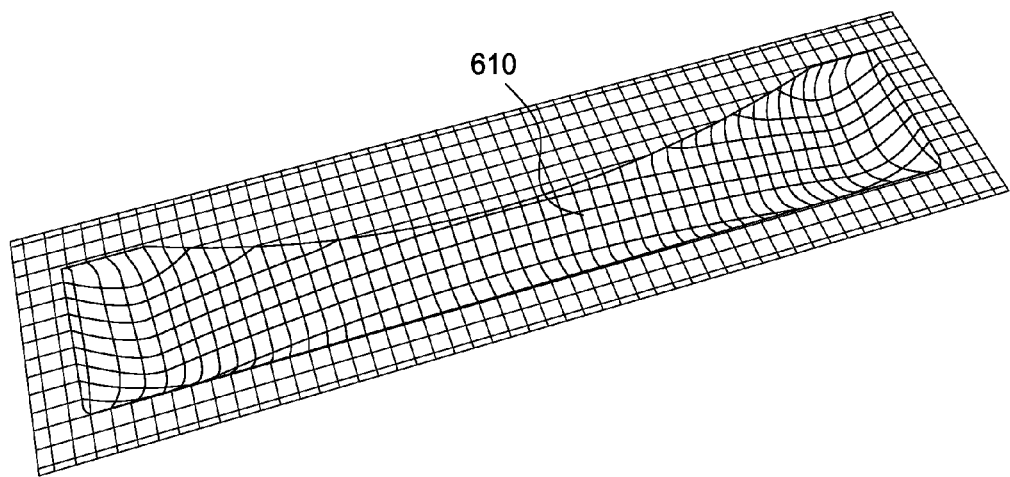
FIG. 6 illustrates a surface patch with added ramp features, according to one embodiment of the present invention

FIG. 6 illustrates a surface patch 610 with added ramp features, according to one embodiment of the present invention. The added ramp features mitigate occlusion of the paraboloid by an edge of the groove bounding the paraboloid. Furthermore, the added ramp features may facilitate fabrication in certain scenarios.

Figure 7:
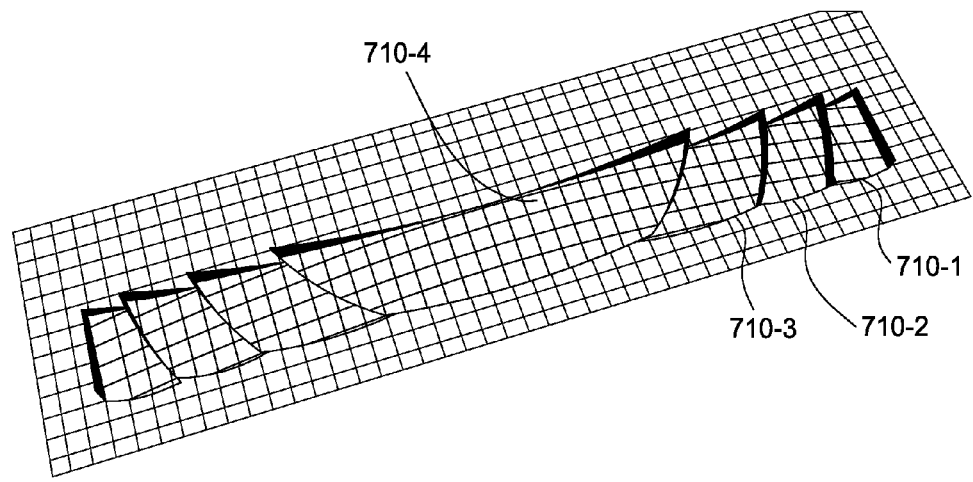
FIG. 7 illustrates a surface patch comprising multiple different quadratic surface segments, according to one embodiment of the present invention.

FIG. 7 illustrates a surface patch comprising multiple different quadratic surface segments 710, according to one embodiment of the present invention. The multiple surface segments 710 enable greater flexibility, manufacturability, and density.

Figure 8:
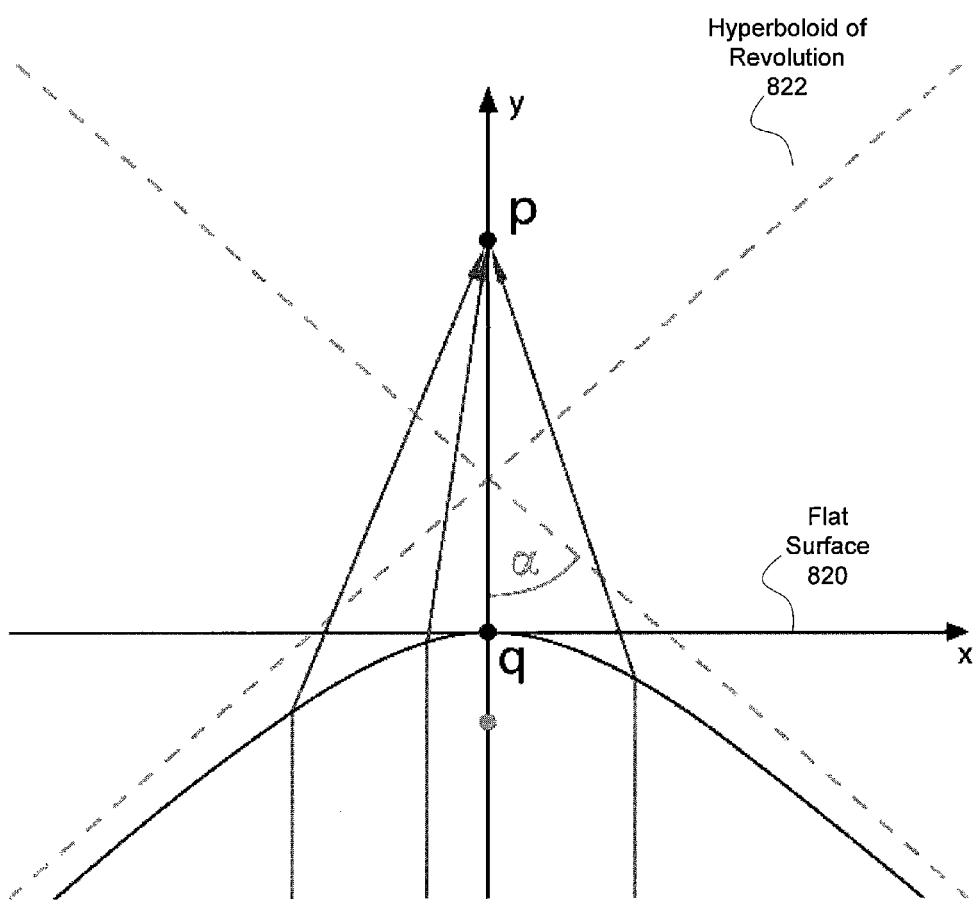
FIG. 8 depicts a hyperboloid through a center point (q), having virtual point (P) as a farther focal point, according to one embodiment of the present invention.

FIG. 8 depicts a hyperboloid through a center point (q), having virtual point (P) as a farther focal point, according to one embodiment of the present invention. A hyperboloid patch represents a transmissive function capable of representing the virtual point (P). The transmissive media includes a flat surface 820 and incorporates a hyperboloid of revolution 822 on the surface seen by a viewer. Equation 8 represents a circular hyperboloid of two sheets, with a major axis along the y dimension.

$$\frac{y^2}{a^2} - \frac{x^2 + y^2}{b^2} = 1 \qquad \text{(Equation 8)}$$

For a viewer position on the +y side of the surface, and light rays identical in direction to $l=(0,1,0)^T$, the lower sheet of the hyperboloid may be used, as shown. In this case, light rays converge at the upper focus, marked as the virtual point (P). Two pieces of information may be used to derive the equations for the hyperboloids that focus light at the virtual point (P): first, for a material having an index of refraction n the hyperboloid surface must have an asymptotic cone of half-angle $\alpha=(\arccos(1/n))$. This relationship provides for expressing b in terms of n and a, as shown below in Equation 9.

$$b = a \tan(\arccos(1/n)) \qquad \text{(Equation 9)}$$

Equation 9 may be re-written as Equation 10.

$$t = b/a = \tan(\arccos(1/n)) \qquad \text{(Equation 10)}$$

Translating the hyperboloid such that its upper focus is at the virtual point (P), recognizing that the distance from the center to a focus is $\sqrt{a^2+b^2}=a\sqrt{1+t^2}$ and substituting center point position (q) into Equation 10 yields Equation 11.

$$\frac{(y + a\sqrt{1+t^2} - p_y)^2}{a^2} - \frac{(x - p_x)^2 + (z - p_z)^2}{a^2 t^2} = 1 \qquad \text{(Equation 11)}$$

A family of hyperboloids may be represented by Equation 11. One hyperboloid from the family of hyperboloids may be selected to meet certain requirements. One selection criteria is that the selected hyperboloid is easily manufactured as a surface feature. A hyperboloid that is relatively shallow with tapered sides is a good candidate for ease of manufacture.

Manufacturing an optical structure on a substrate to represent a virtual point is illustrated above in FIGS. 2-8. FIGS. 9A-12 illustrate techniques for sampling and employing multiple virtual points to represent a 3D object or scene as a highlight hologram.

Figure 9A:
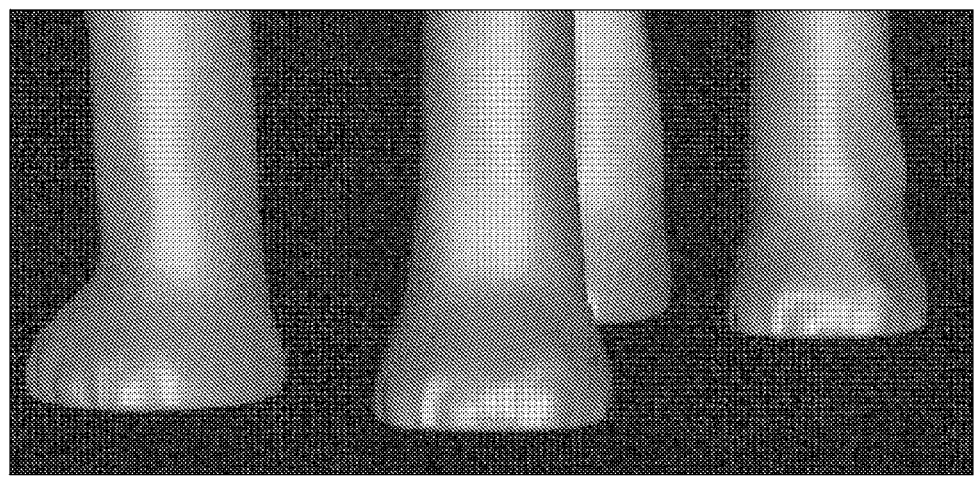
FIG. 9A illustrates a three-dimensional model from which a probability distribution may be calculated, according to one embodiment of the present invention.

FIG. 9A illustrates a 3D model from which a probability distribution is calculated, according to one embodiment of the present invention. As shown, the model is rendered using Phong shading.

Because a generated highlight hologram typically includes relatively few sample points, placing each point in a visually meaningful location is important to convey a shape of an object as clearly as possible. One challenge is selecting a relatively small set of points that can convey sufficient visual cues about the object to inspire a sense of perceiving the object in a viewer. Certain techniques in the art of non-photorealistic rendering address the problem of sparse representation, such as techniques for sparse line rendering. One approach includes building a probability distribution over a target object model mesh (graphics object) based on the likely locations of lines in sparse line drawings, sampling the distribution to yield an initial set of points, and then selecting a subset of the sampled points that result in non-overlapping grooves.

Figure 9B:
FIG. 9B illustrates a probability distribution calculated from the three-dimensional model of FIG. 9A, according to one embodiment of the present invention.

FIG. 9B illustrates a probability distribution calculated from the 3D model of FIG. 9A, according to one embodiment of the present invention. Brighter points indicate a higher probability value, described below.

In one embodiment, initial sampling is performed by computing locations of lines on a surface of one or more objects for a dense sampling of viewpoints around a central view point. Viewpoints are sampled on an angular range. In one implementation, a 30-degree angular range is sampled, although different angular ranges may be used as well. Only a limited vertical range needs to be represented by the highlight hologram, so only a limited vertical range needs to be sampled in this step. For example a 5-degree vertical range may be sampled. For each vertex in an object model, a fraction of viewpoints for which a line-drawing definition places a line within a face touching the vertex is computed. Normalizing per-vertex values over the mesh comprises one technique for computing the probability distribution. Sample points are then selected from the probability distribution.

Figure 9C:
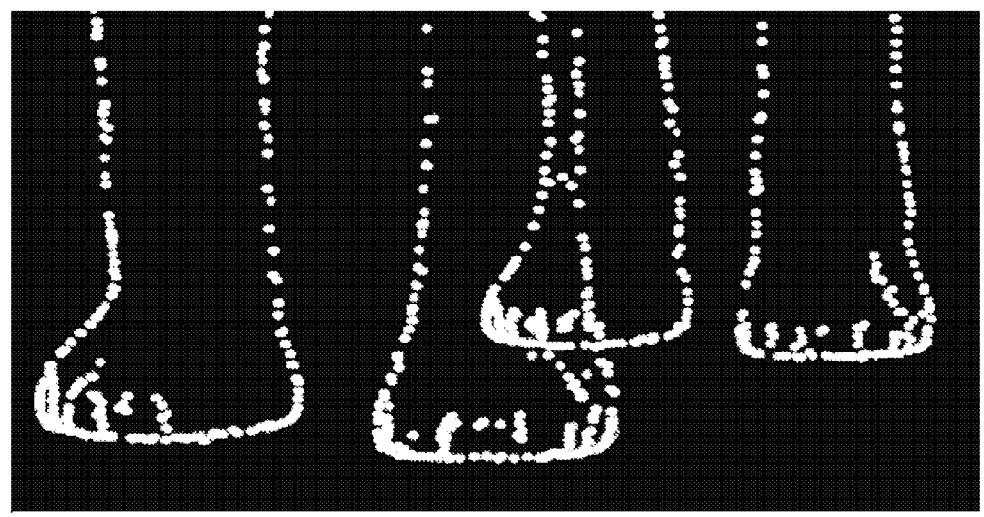
FIG. 9C illustrates point sampling and packing, according to one embodiment of the present invention.

FIG. 9C illustrates point sampling and packing, according to one embodiment of the present invention. In one embodiment, the probability distribution of FIG. 9B is converted to grooves for fabricating a highlight hologram into a substrate. Using ray tracing, the extent of viewpoints from which a sample location should be visible is determined. Then a groove of bounding rectangles comprising either paraboloid (for reflective hologram) or hyperboloid (for transmissive hologram) patches is derived for each sample point. Completely invisible sample points may be pruned. A complete set of grooves is represented at this point, such that each sample point now has an associated groove configured to represent a corresponding virtual point (P) for the sample point.

Because overlapping grooves are impractical to fabricate, a non-overlapping subset of grooves is selected from the complete set of grooves. In one embodiment, selecting a subset of grooves comprises traversing the complete set of grooves in an arbitrary sequence, adding each candidate groove from the complete set of grooves to an output set of grooves if the candidate groove has a bounding rectangle that does not overlap any grooves previously added to the output set of grooves. If a bounding rectangle for the candidate groove overlaps any grooves within the output set of grooves, then the candidate groove can be either discarded or accommodated.

In one embodiment, a candidate groove is accommodated by moving the candidate groove based on moving the candidate point to a nearby point location on the mesh to avoid overlap. To accomplish this, all vertices on the mesh within a distance k of the candidate point p are collected according to Equation 12:

$$N_k(p) = \{q \mid d(p,q) \leq k\} \qquad \text{(Equation 12)}$$

A weight is assigned to each point based on a previously computed probability and a Euclidean distance to point p. For example, the weight can be a function of the probability and a corresponding distance. The points are sorted by weight in decreasing order to form a list of adjacent points. The list is traversed to find a non-overlapping replacement for the initial sample.

Figure 10:
FIG. 10 illustrates adding color to a hologram, according to one embodiment of the present invention.

FIG. 10 illustrates adding color to a hologram, according to one embodiment of the present invention. Color or shading may be added to a highlight hologram. As shown, different color or shading values may be computed as a two-dimensional (2D) color map and applied to each rectangular groove based on an associated vertex color. In one embodiment, a transparent color film is printed with the color map and physically applied to a hologram substrate.

Figure 11:
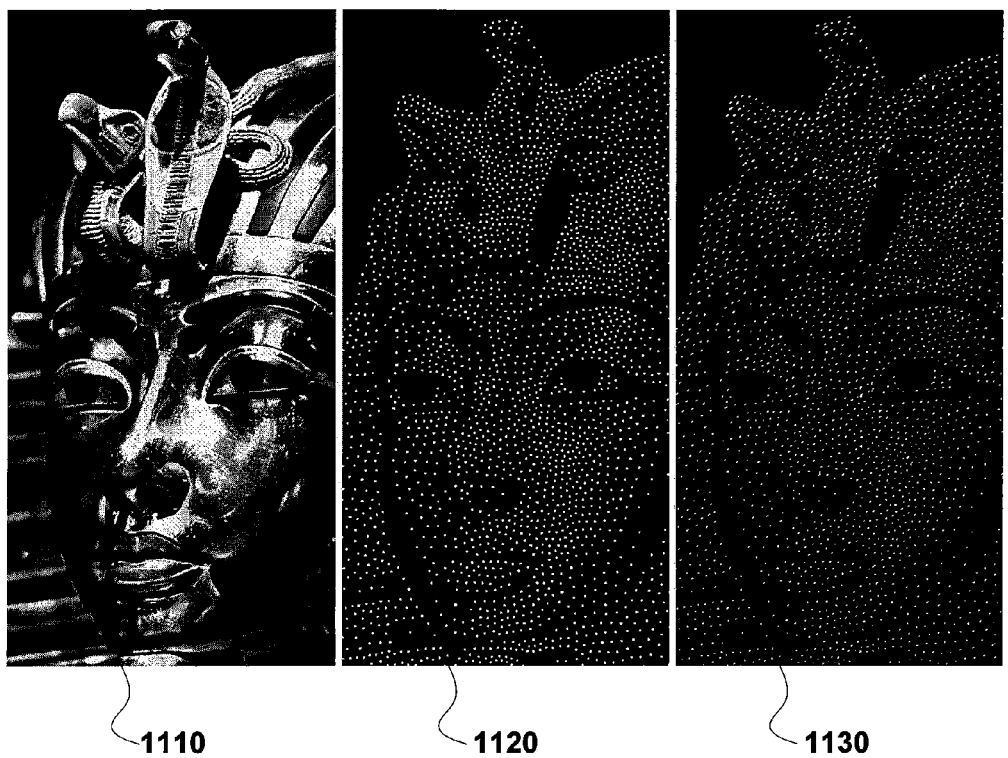
FIG. 11 illustrates generating a stippled image, according to one embodiment of the present invention.

FIG. 11 illustrates generating a stippled image, according to one embodiment of the present invention. A 2D image may be represented as a stipple pattern, which can then be engraved into a substrate. A point set from a 2D image is constructed, for example using the weighted Voronoi stippling algorithm. Any highly-curved small curve is sufficient to create a highlight for most viewing positions and most directions of incident light. In one embodiment, small hemispherical grooves are fabricated for each stipple point. Each hemispherical groove may have the same radius. This technique may be implemented for both reflective and transmissive substrates. Image 1110 is an original gray scale image. Image 1120 represents a point set representing the original gray scale image. Image 1130 is a fabricated rendering of the point set using short and shallow grooves.

Figure 12:
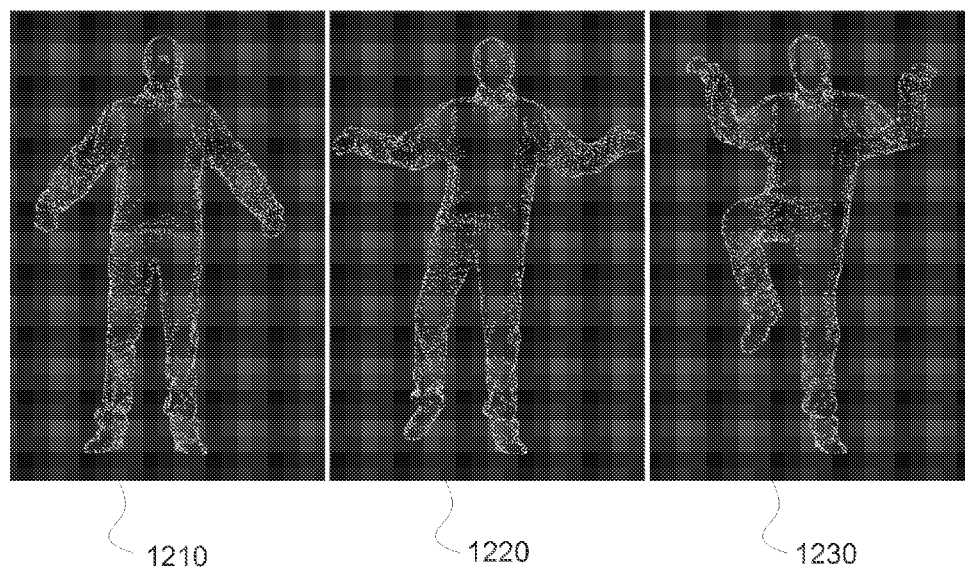
FIG. 12 illustrates generating an animated sequence, according to one embodiment of the present invention.

FIG. 12 illustrates generating an animated sequence, according to one embodiment of the present invention. An animated sequence comprises a set of 2D images. A different image from the set of 2D images is revealed to an observer based on viewing position. By progressively changing viewing position, a viewer is able to see a complete animated sequence. For example, image 1210 is a first image in an animated sequence including, without limitation, images 1210, 1220 and 1230.

An animated mesh with vertex correspondence may be used to generate the animated sequence. For each mesh, a point set is generated using the point sampling technique described in FIGS. 9A-9B. Gathered vertex indices are merged and traversed in an arbitrary order to generate grooves as follows. For each vertex, a potential groove is computed for every frame in which the projected vertex point is visible. Overlapping grooves are merged. A given original two grooves may be merged by deleting the original two grooves and computing a merged groove with an appropriately adjusted field of view, such that a groove produces a visible highlight for the frames associated with the original two grooves. This process may be repeated until no two grooves overlap for any frames in the animation sequence. Smoother transitions between two consecutive frames may be achieved by incorporating as many grooves as practical to represent related samples. Linear interpolation may be used on samples associated with the two frames.

Figure 13:
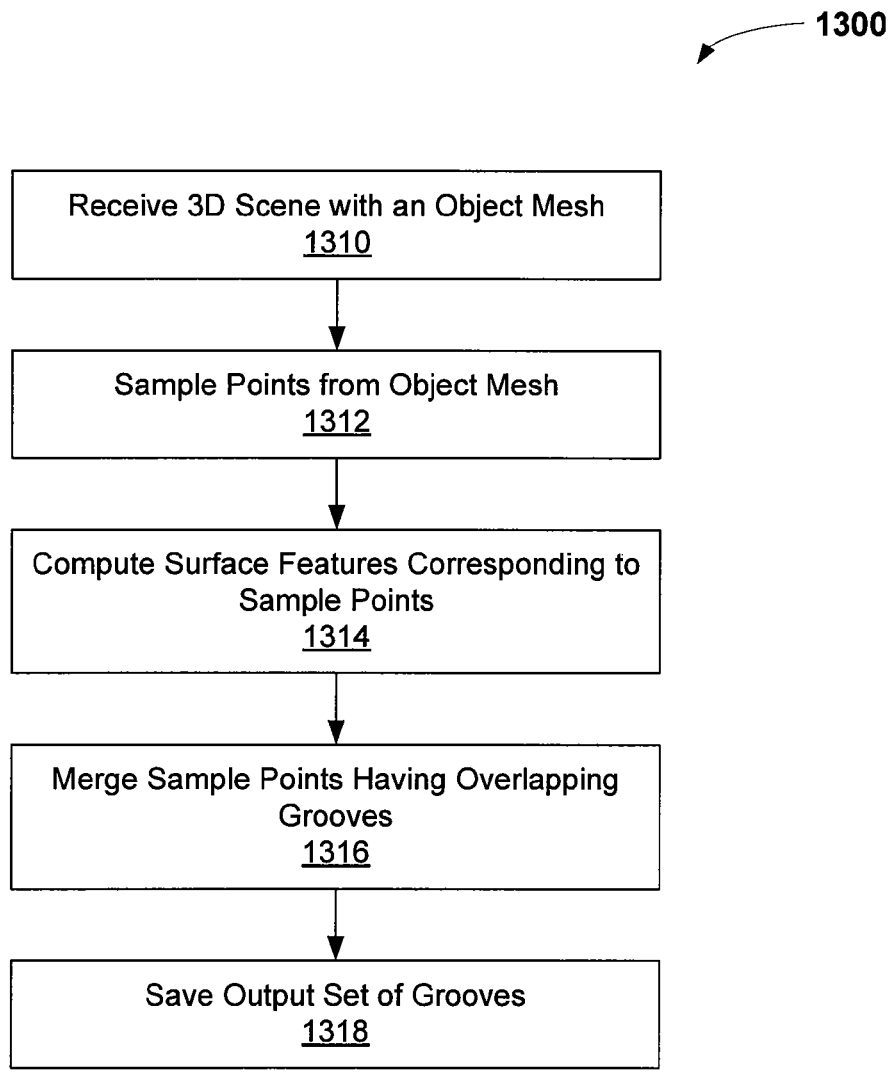
FIG. 13 is a flow diagram of method steps for generating a computational highlight hologram, according to one embodiment of the present invention.

FIG. 13 is a flow diagram of method steps 1300 for generating a computational highlight hologram, according to one embodiment of the present invention. Although the method steps 1300 are described in conjunction with the systems of FIG. 1, persons skilled in the art will understand that any systems configured to perform the method steps is within the scope of the present invention.

The method begins in step 1310 where a software application configured to generate a hologram receives a 3D scene with an object mesh. The object mesh includes a plurality of vertices that define a geometric shape of the object mesh. In step 1312, the software application samples points from the object mesh. In one embodiment, the software application samples points from the object mesh as described in FIG. 9A. In step 1314, the software application computes surface features corresponding to the sample points. As described in greater detail in FIGS. 2-8, each surface feature may comprise a paraboloid or hyperboloid patch. Each patch may be concave or convex. Each patch defines a groove that may be fabricated from a substrate, such as by engraving. In one embodiment each groove is characterized by a rectangular region on the substrate. In step 1316, sample points having overlapping grooves are merged. In one embodiment, merging is performed by accommodating additional grooves as described in FIG. 9C. In another embodiment, merging is performed as described in FIG. 12. In step 1318, the software application saves an output set of grooves, each having adequate geometric specification to be fabricated as a surface feature on a substrate to produce a desired holographic effect. In one embodiment, color information for each groove in the output set of grooves is also saved. The method terminates in step 1318.

In one embodiment the software application saves the output set of grooves as a computer readable file. The computer readable file may comprise a set of machining instructions for a fabrication machine, such as a numerically controlled engraver or milling machine, to fabricate a corresponding hologram. Because each surface feature for each virtual point included in a highlight hologram is computed independently, the technique disclosed herein may be applied to non-planar substrates. For example, a planar set of virtual points may be represented within a curved substrate.

In sum, a technique for processing a graphics model comprising an object mesh into a set of grooves that may be fabricated on a physical substrate to create a hologram on the substrate is disclosed. Representative points are sampled from the object mesh and define a set of virtual points. Surface features comprising paraboloid or hyperboloid patches are computed to focus light in a way that creates a perception that the virtual points collectively represent the object mesh when viewed from a defined range of viewing positions. To avoid specifying overlapping patches, which are impractical to fabricate, certain of the sample points may be merged. An output set of grooves is saved and may be used to specify fabrication of a highlight hologram on the physical substrate.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for generating a highlight hologram based on one or more patches, the method comprising:
sampling, from an object mesh of a graphics object, a plurality of points defining one or more representative geometric features of the graphics object;
calculating a respective shape and dimensions for each of a plurality of patches, wherein each of the plurality of patches corresponds to a respective one of the plurality of sampled points, wherein each patch of the plurality of patches represents a respective groove to be etched into a substrate, such that the groove reflects light from a source through a respective virtual point representing the respective sampled point, and wherein each respective groove comprises:
a substantially rectangular cavity having dimensions determined to correspond to a field of view of the respective virtual point for the respective groove, and
one of a paraboloid and a hyperboloid disposed below a surface of the substrate and within the dimensions of the substantially rectangular cavity, wherein at least one point on the paraboloid or the hyperboloid is tangential to the surface of the substrate;
determining a plurality of non-overlapping patches based on the calculated plurality of patches, further comprising:
upon determining that at least a portion of a first calculated patch overlaps with at least a portion of a second calculated patch, selecting the first calculated patch for inclusion in the plurality of non-overlapping patches; and
calculating a replacement patch for the second calculated patch, based on a selected point on the object mesh within a predefined distance of the sampled point corresponding to the second calculated patch;
storing the plurality of non-overlapping patches in memory.

2. The method of claim 1, wherein the graphics object comprises a three-dimensional geometric mesh.

3. The method of claim 1, wherein the graphics object comprises a two-dimensional image.

4. The method of claim 1, wherein the graphics object comprises an animation sequence of two-dimensional images.

5. A non-transitory computer-readable medium including instructions that, when executed by a processing unit, cause the processing unit to generate a highlight hologram based on one or more patches, by performing the steps of:
- sampling, from an object mesh of a graphics object, a plurality of points defining one or more representative geometric features of the graphics object;
- calculating a respective shape and dimensions for each of a plurality of patches, wherein each of the plurality of patches corresponds to a respective one of the plurality of sampled points, wherein each patch of the plurality of patches represents a respective groove to be etched into a substrate such that the groove reflects light from a source through a respective virtual point representing the respective sampled point calculating a respective shape and dimensions for each of a plurality of patches, wherein each of the plurality of patches corresponds to a respective one of the plurality of sampled points, wherein each patch of the plurality of patches represents a respective groove to be etched into a substrate, such that the groove reflects light from a source through a respective virtual point representing the respective sampled point, and wherein each respective groove comprises:
  - a substantially rectangular cavity having dimensions determined to correspond to a field of view of the respective virtual point for the respective groove, and
  - one of a paraboloid and a hyperboloid disposed below a surface of the substrate and within the dimensions of the substantially rectangular cavity, wherein at least one point on the paraboloid or the hyperboloid is tangential to the surface of the substrate;
- determining a plurality of non-overlapping patches based on the calculated plurality of patches, further comprising:
  - upon determining that at least a portion of a first calculated patch overlaps with at least a portion of a second calculated patch, selecting the first calculated patch for inclusion in the plurality of non-overlapping patches; and
  - calculating a replacement patch for the second calculated patch, based on a selected point on the object mesh within a predefined distance of the sampled point corresponding to the second calculated patch;
- storing the plurality of non-overlapping patches in memory.

6. The non-transitory computer-readable medium of claim 5, wherein the graphics object comprises a three-dimensional geometric mesh.

7. The non-transitory computer-readable medium of claim 5, wherein the graphics object comprises a two-dimensional image.

8. The non-transitory computer-readable medium of claim 5, wherein the graphics object comprises an animation sequence of two-dimensional images.

9. A system, comprising:
one or more computer processors; and
a non-transitory memory containing computer-readable program code that, when executed by operation of the one or more computer processors, performs an operation for generating a highlight hologram based on one or more patches, the operation comprising:
- sampling, from an object mesh of a graphics object, a plurality of points defining one or more representative geometric features of the graphics object;
- calculating a respective shape and dimensions for each of a plurality of patches, wherein each of the plurality of patches corresponds to a respective one of the plurality of sampled points, wherein each patch of the plurality of patches represents a respective groove to be etched into a substrate, such that the groove reflects light from a source through a respective virtual point representing the respective sampled point, and wherein each respective groove comprises:
  - a substantially rectangular cavity having dimensions determined to correspond to a field of view of the respective virtual point for the respective groove, and
  - one of a paraboloid and a hyperboloid disposed below a surface of the substrate and within the dimensions of the substantially rectangular cavity, wherein at least one point on the paraboloid or the hyperboloid is tangential to the surface of the substrate;
- determining a plurality of non-overlapping patches based on the calculated plurality of patches, further comprising:
  - upon determining that at least a portion of a first calculated patch overlaps with at least a portion of a second calculated patch, selecting the first calculated patch for inclusion in the plurality of non-overlapping patches; and
  - calculating a replacement patch for the second calculated patch, based on a selected point on the object mesh within a predefined distance of the sampled point corresponding to the second calculated patch;
- storing the plurality of non-overlapping patches in memory.

10. The system of claim 9, wherein the graphics object comprises a three-dimensional geometric mesh.

11. The system of claim 9, wherein the graphics object comprises a two-dimensional image.

12. The system of claim 9, wherein the graphics object comprises an animation sequence of two-dimensional images.

* * * * *